United States Patent [19]

Honebrink et al.

[11] 4,086,005
[45] Apr. 25, 1978

[54] AUDIO-VISUAL PROGRAMMER

[75] Inventors: Erik N. Honebrink, Champlin, Minn.; Jon N. Myntti, Dayton, Ohio

[73] Assignee: Audio-Sine, Inc., Minneapolis, Minn.

[21] Appl. No.: 735,594

[22] Filed: Oct. 26, 1976

[51] Int. Cl.² ............................................ G03B 15/03
[52] U.S. Cl. ...................................... 352/133; 352/6; 353/86; 353/94; 360/80
[58] Field of Search .................... 352/6, 7, 8, 40, 133; 353/11, 15, 86, 94; 360/80

[56] References Cited

U.S. PATENT DOCUMENTS

| | | | |
|---|---|---|---|
| 3,622,236 | 11/1971 | Novy | 353/94 |
| 3,643,217 | 2/1972 | Morphew et al. | 352/133 |
| 3,686,505 | 8/1972 | De Pasquale | 353/94 |
| 3,772,473 | 11/1973 | Parham | 360/80 |
| 3,841,744 | 10/1974 | Rubin et al. | 353/15 |
| 3,881,185 | 4/1975 | Broline | 353/15 |

*Primary Examiner*—Russell E. Adams
*Attorney, Agent, or Firm*—Orrin M. Haugen

[57] ABSTRACT

A multimedia motion picture and photographic slide projection control apparatus which permits a plurality of projector devices to be controlled from an operator's console. Manually operable switch means, operating through digital control means, develops a Program Command Code Word for each change in switch conditions, the control word being decoded to provide an ON/OFF response by selected projectors, as well as lamp dissolve rate response. Simultaneously, the Program Command Code Words are recorded on a magnetic tape such that when a given presentation has been developed to the satisfaction of the operator, the stored command words can be used to control the projection devices to provide repetitive performances of the same audio-visual presentation.

11 Claims, 19 Drawing Figures

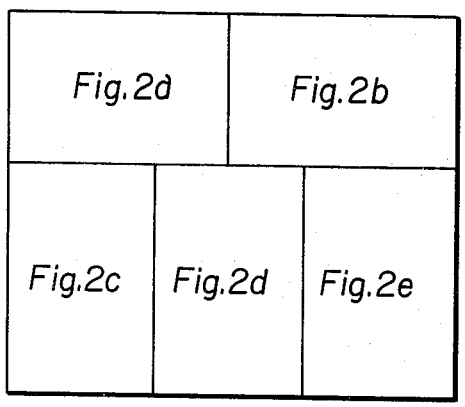
*Fig.2*
*Fig.5*
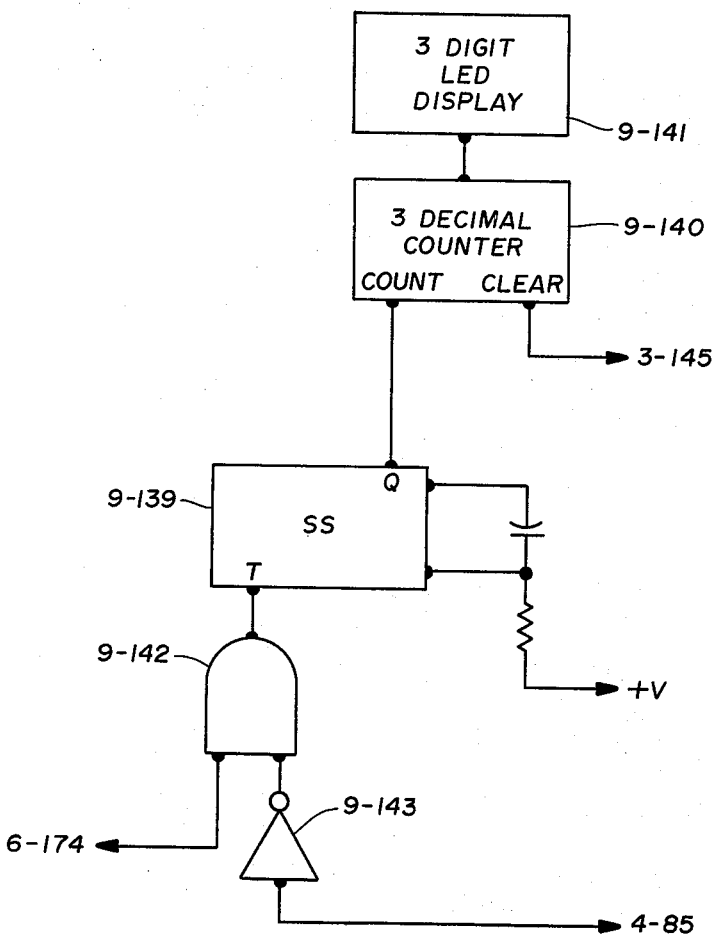
*Fig.9*

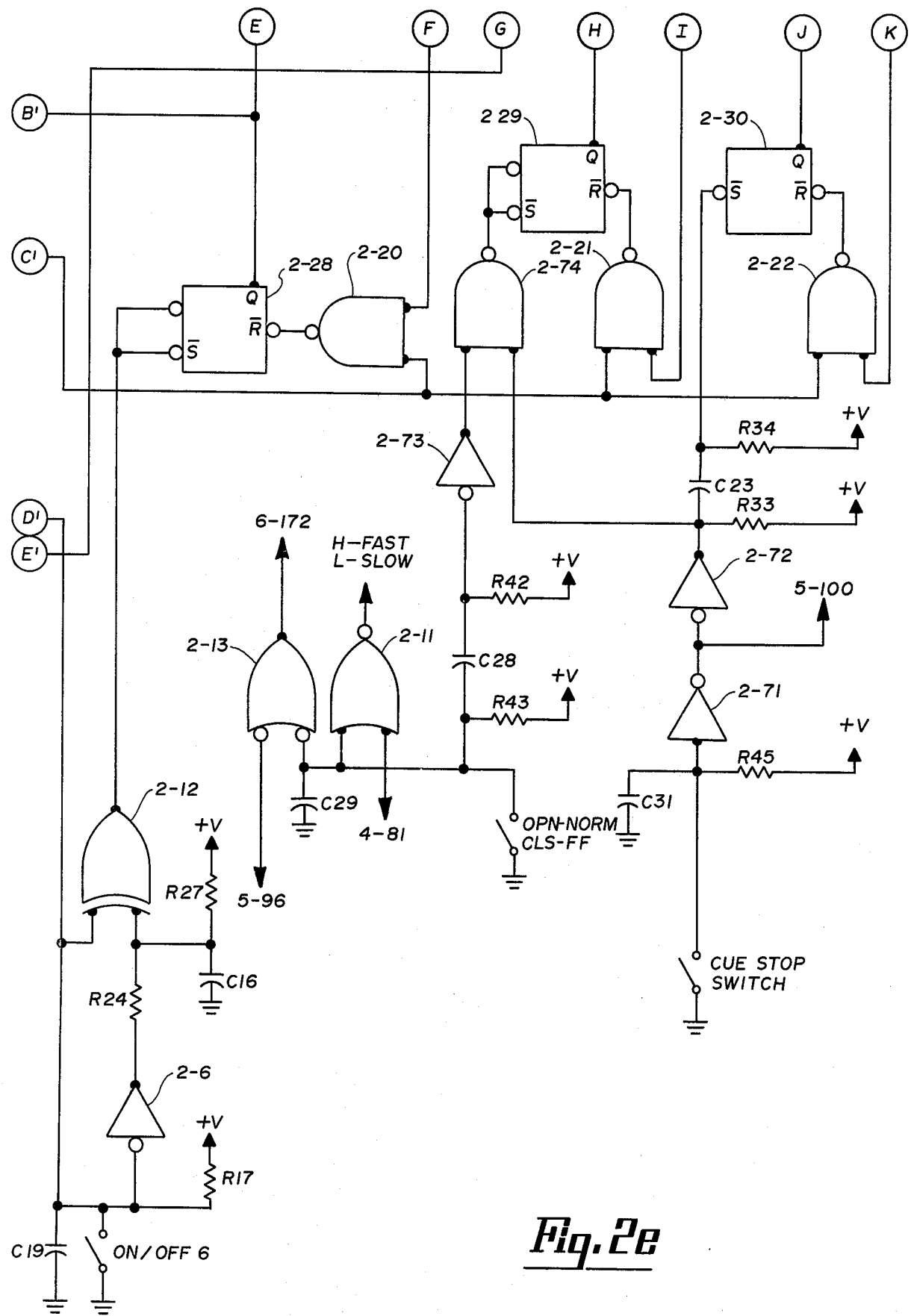

AUDIO-VISUAL PROGRAMMER

BACKGROUND OF THE INVENTION

This invention relates generally to digital control apparatus, and more specifically to the design of a digital controller for a multimedia photographic projection system whereby plural projectors can be selectively turned on and off and the projection lamps therein controlled to provide variable dissolve rates, either under manual or automatic control.

In the prior art, there are disclosed a variety of techniques for controlling plural photographic film and slide projectors so as to provide desires visual effects. For example, programmable devices are known whereby the turn-on and turn-off times for the film advance drive of plural motion picture projectors or the slide advance of slide projectors can be controlled without the need for manual intervention. Also, it is known that special visual effects can be achieved by controlling the rate at which the projection lamps of selected ones of plural projectors are brought up to full illumination and subsequently dimmed. However, such prior art devices have tended to be quite complex and somewhat expensive. Also, the limited flexibility of the prior art controllers tends to make it difficult to obtain a wide variety of desired presentations.

The programmable audio-visual display device controller of the present invention obviates all of the foregoing limitations. Because it used digital techniques throughout, and is fabricated from well-known and commercially available digital logic components. Also, the manner in which command words are generated and transmitted to selected projectors while being simultaneously recorded on magnetic tape for later automatic control of such projectors allows the utmost in flexibility of control of the operating parameters of the audio/visual display devices employed in the system. In accordance with the teachings of the present invention, there is provided an operator's console having three banks of manually-operable push-button switches. In the first bank are switches, equal in number to the number of projection devices to be controlled, for selectively controlling the ON/OFF state of the film advance mechanism in the projectors. In the second bank are a number of switches, again equal in number to the number of projection devices to be controlled, for selectively governing the rate at which the projection lamps in the plural projectors are illuminated and dimmed. The third bank of switches includes a Cue Stop switch and a Fast-Forward switch for controlling a cartridge type magnetic tape recorder/reproducer. Each time any one of the switches in the plural banks is operated, a digital code word is generated in a parallel format. The parallel word is serialized and transmitted to a receiver and at the same time the serial version of the command word may be stored on magnetic tape. The transmitted serial version of the command word is sent to a receiver module which reconstructs the command word into the parallel format. Subsequently, the command word is decoded by digital logic circuitry and applied to the appropriate control segments in the projectors. Once a program has been prepared to the satisfaction of the operator, he may place the magnetic tape in a playback mode and transmit the serially recorded code words from the tape to the aforementioned receiver network where the code words are reconstructed in a parallel format for application to the decoder network. Because the tape device employed is of the cartridge variety utilizing an endless loop, it is often the case that the desired program does not completely fill the available space on the tape. The operator may encode a fast-forward command by suitable operating the Fast-Forward switch in the third bank of manually operable push-button switches and when this command is sensed by the decoder network a circuit comes into play to drive the endless loop of magnetic tape at two times its normal speed to bring it to a desired reference point so that the programmed visual display may be repeated.

OBJECT

It is accordingly the principle object of the present invention to provide a new and improved digital controller for photographic devices.

Another object of the present invention is to provide a digital controller for projection devices whereby plural projectors may be selectively controlled in a variety of ways to provide a desired visual effect.

Still another object of the invention is to provide a multimedia projection system wherein plural photographic projectors may be selectively turned on and off and/or have their projection lamps intensified and dimmed at selective rate.

Still another object of the invention is to provide a controller of the type described which is implemented throughout with digital logic components.

A still further object of the present invention is to provide a low-cost, highly-flexible, digital control console for generating desired special visual effects with the use of plural film projectors of either the motion picture or the slide variety.

DESCRIPTION OF THE DRAWINGS

These and other objects and advantages of the present invention will become apparent from the following detailed description of the preferred embodiment taken in conjunction with the accompanying drawings in which:

FIG. 2 illustrates the manner in which the views of FIGS. 2a, 2b, 2c, 2d, and 2e should be arranged to form a composite logic diagram;

FIGS. 2a, 2b, 2c, 2d, and 2e together illustrate the implementation of the Change-of-State Detector, the Priority Network, and Encoder and one of the multiplexer units depicted in the block diagram of FIG. 1;

FIG. 5 illustrates the manner in which the views of FIGS. 5a and 5b are to be orientated;

FIG. 9 illustrates the implementation of the event counter feature shown in the block diagram of FIG. 1.

DESCRIPTION OF THE PREFERRED EMBODIMENT

Figure 1:
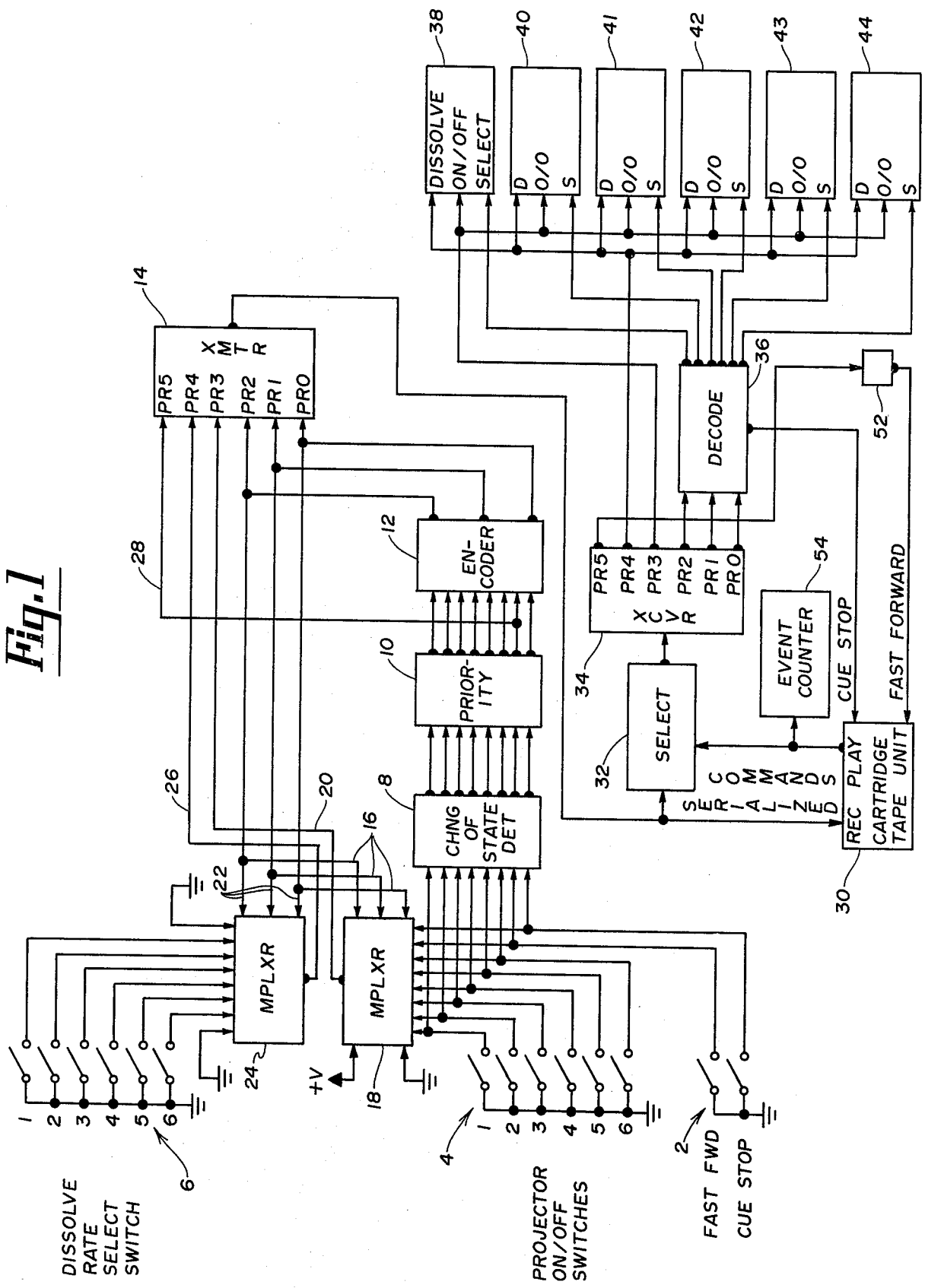
FIG. 1 is a general block diagram of the preferred embodiment of the present invention.

Referring now to FIG. 1, there is shown a block diagram of the preferred embodiment of the present invention. After describing the overall organization with the aid of this block diagram, the detail logic circuitry used to implement the system will be discussed.

Shown at the lefthand side of FIG. 1 are first, second and third banks of single pole, double-throw manually operable push-button switches, such banks being identified generally by the numerals 2, 4 and 6, respectively. These switches, along with other display lamps are arranged on an operator's console (not shown) and are labeled "on/off", "dissolve rate" and "fast-forward" and "cue stop". In each of the banks 2, 4 and 6, all of the switches have one terminal thereof connected in common to ground. The remaining contacts in the switch banks 2 and 4 are individually connected to the input terminals of a Change-of-State Detector 8. As will be further described later on, included within the Change-of-State Detector 8 are a plurality of latches which are arranged such that the opening or closing of any of the SPDT switches in the banks 2 or 4 causes a corresponding latch in the Detector 8 to be set.

The output lines from the Change-of-State Detector 8 are connected to input terminals of a priority network 10. The priority network 10 operates to select the highest priority switch closure in the event that more than one of the switches in the banks 2 and 4 are simultaneously operated. The outputs from the priority Network 10 are applied to an Encoder Network 12 which develops a three-bit binary code which corresponds to one of the eight switches contained in the banks 2 and 4. The signals representing the three-bit binary code are applied to the terminals PR 0, PR 1, and PR 2 of a transmitter device 14. The output from the encoder is also coupled over the lines 16 to the selector inputs of a multiplexer device 18. The data inputs to the multiplexer 18 are coupled to the ungrounded terminals of the switches in the bank 4. The output from the multiplexer is applied by way of a conductor 20 to the PR 3 terminal of the transmitter 14. The output code from the encoder device 12 is also coupled by way of lines 16 and 22 to the selector inputs of a second multiplexer 24. The data inputs to the multiplexer 24 are individually connected to the ungrounded terminals of each of the switches in the bank 6. The output from the multiplexer 24 is connected by conductor 26 to the PR 4 terminal of the transmitter 14. A conductor 28 couples a signal from the output of the Priority Network 10 to the terminal PR 5 of the transmitter 14.

The transmitter 14 converts the binary code applied to its input to a serial format suitable for recording on a single track of a cartridge tape unit 30. The serialized data from the transmitter 14 is also passed through a selector switch 32 to a receiver 34 where the serial code is reconstructed into the identical parallel input code which was applied to the transmitter 14. The output lines from the receiver 34 bearing the code bits 0, 1 and 2 are applied as inputs to a decoder network 36. The decoder network 36 interprets these bits to uniquely select one of six projectors which may be motion picture type projectors, slide projectors, or a combination of both. The projectors are identified by numerals 38 through 48 in the drawing of FIG. 1. Code bits 3 and 4 from the receiver do not pass through the decoder but instead are applied directly to the control terminals of each of the projectors. Code bit 3 determines the on/off status of a selected projector and code bit 4 controls the dissolve rate of the selected projector. Code bit 5 from the receiver 34 is connected to a conductor 50 to a fast-forward control network 52 which is, in turn, coupled to the cartridge tape unit 30.

A three-digit event counter having a suitable visual display, and identified by numeral 54 is the block diagram, is coupled to the playback output terminal of the cartridge tape unit 30 and the displayed information is available at the operator's console for use in editing a program.

Now that the general organization of the preferred embodiment has been described, an explanation will be given as to its mode of operation.

OPERATION - FIG. 1

The purpose of this invention is to provide control of up to six devices which may be any combination of slide projectors or movie projectors. While only six such devices are described, it should be apparent to those skilled in the art that the invention can be modified to include a greater or lesser number of projectors without the exercise of inventive skills.

Specifically, the desired control to be afforded by the present invention is to be able to select the time of the coming-on or turning-off of the movie slide projectors and in the case of slide projectors, control over the rate at which the lamps turn on and off and at which the slide tray advances. The commands to control these devices are generated by the switches in banks 2, 4 and 6 on the programmer console (not shown). When operating in the programming mode, changes in these switch positions cause the projectors to operate in the desired manner and at the same time, a digital coded version of each command is stored on a cartridge tape unit. Once programmed, the tape can be played and these commands are decoded to operate the projectors without human intervention. Specific commands are generated by the six Dissolve Rate Select Switches in bank 6, the six Projector On/off Switches in bank 4, and a Fast-Forward Switch and a Cue Stop Switch in the bank 2.

Usually, the Dissolve Rate Switches in bank 6 are in a fixed position over a sequence of on/off commands. However, the dissolve rates may be specified for any command to thereby create special visual effects.

Thus it can be seen that a command is initiated upon the changing of the state of any one of the six projector on/off switches in bank 4. The opening or closing of any one of these six on/off switches causes a corresponding latch in the Change-of-State Detector 8 to be set. The closure of either the Fast-Forward or Cue Stop switches in bank 2 will also set corresponding latches in the Change-of-State Detector 8. The latch will remain set until the command it represents has been completely encoded. In the event that more than one switch in the banks 2, 4 and 6 are simultaneously operated, the Priority Network 10 selects the highest priority switch closure and encodes it in the encoder network 12. Thus the output of the encoder is a three-bit binary code whose permutation can uniquely identify any one of the eight switches which has been manipulated in the banks 2 and 4. This three-bit code is present on the input terminals PR 0, PR 1 and PR 2 of the transmitter 14 and comprise the lowest order three bits of the six-bit Program Command Code Word ultimately developed.

The multiplexer 18 is used to sense the state of the active switch, i.e., to determine whether it is open or closed. The three-bit binary code selects the associated input line from the switches in bank 4 and if the selected switch is open, the output of the multiplexer will be a binary "1" signal and if the switch is closed, the output of the multiplexer will be a binary "0". This forms the next bit of the Program Command Code Word (PR 3). In a similar fashion, multiplexer 24 is used to sense the position of the Dissolve Rate Select Switches associated with the active Projector On/off switch and the output of the multiplexer 24 provides bit four of the Program Command Code Word. Thus, it has been shown how a five-bit binary code has been developed in which bits 0, 1 and 2 define the active switch, bit 3 defines whether it is opened or closed and bit 4 defines a fast or slow dissolve rate.

Since the cartridge tape in unit 30 is an endless loop, there will generally be some dead time at the end of a program. The Fast-Forward command speeds up the tape to race ahead to the first command in the program, which is generally a Cue Stop. During playback, the Cue Stop commands may be inhibited by the operator at the console to allow continuous play to take place. The Fast-Forward command is encoded much like the rest of the commands, but is additionally used to form bit 5 of the Program Command Code Word. Thus, any of the input switch actions are converted into a six-bit binary command word. In the event of simultaneous switch actions, these are prioritized and serialized. When an input command has been encoded in encoder 12, the transmitter 14 converts this six-bit binary code into a serial format suitable for recording on a single track of the cartridge tape unit 30. This serial data is also fed through the select switch 32 to the receiver 34 where it is reconstructed into a parallel input code word identical to that presented at the input of the transmitter unit 14. The transmitter 14 and receiver 34 comprise a single commercially available integrated circuit chip known as a "Universal Asynchronous Transmitter/Receiver".

The decoder unit 36 interprets bits 0, 1 and 2 of the command word to select one of the six projectors 38 through 48 or to generate a Cue Stop command to control the cartridge tape unit 30.

The state of bit 3 of the Program Command Word determines whether the projector will be turned on or off while the state of bit 4 of the command word specifies whether the dissolve rate will be fast or slow. Bit 5 causes the fast forward mode to be initiated, while any other subsequent command causes reversion to the normal speed mode.

Since the serial output from the transmitter 14 is connected to the Record input of the cartridge tape unit 30, when a programming sequence has been completed, the cartridge tape will contain the coded sequence of all of the projector commands. Now, when this tape is played back, the serial data presented to the receiver 34, via the select network 32, is identical to the data presented during the programming sequence and thus, the projectors respond in an identical manner.

During playback, each command word presented increments an event counter 54 which is provided with a three-digit LED (light emitting diode) display. A person may then readily edit a program by playing it to a specific event count and re-recording a new command at the desired point.

This completes the general description of the overall organization and mode of operation. Consideration will be given next to the various elements used in the implementation of the system depicted by the block diagram of FIG. 1.

PRIORITY ENCODE LOGIC

FIGS. 2a, 2b, 2c, 2d, and 2e, when arranged as shown in FIG. 2, depict the logic circuitry for implementing the Change-of-State Detector 8, the Priority Network 10, the Multiplexer 18 and certain other control circuitry used in the system. The priority encode logic deals with the circuitry used to convert an input command into the proper three-bit binary code. The single-pole double-throw switches shown at the bottom of FIGS. 2c, 2d and 2e correspond to the On/Off switches in bank 4 in FIG. 1. It is to be noted that the logic level determined by the On/Off switch 1 is presented to one input of an Exclusive OR gate 2-7 while the complement of the logic level determined by On/Off switch 1 is presented to the other input of this Exclusive OR gate by way of inverter 2-1. Thus, for either an "on" or an "off" static condition, the Exclusive OR condition is satisfied, and the output of the gate 2-7 is high. When the switch is thrown such that its state changes, the response of inverter 2-1 is delayed by the RC network comprised of resistor R21, capacitor C13 and resistor R32. If On/Off switch 1 changes from an open to a closed position, both inputs to gate 2-7 will be low during the period that capacitor C13 is charging which will cause the output of gate 2-7 to go low. If On/Off switch 1 changes from a closed to an open condition, then both inputs to the gate 2-7 will be high during the period that capacitor C13 is charging so that the output from gate 2-7 will also be low. Thus, either change in switch contact 1 will cause a low signal to appear at the output of the Exclusive OR gate 2-7 to thereby set the flip-flop or latch 2-23. Latch 2-23 will remain set until the command associated with that switch has been completely encoded.

Figure 2A:
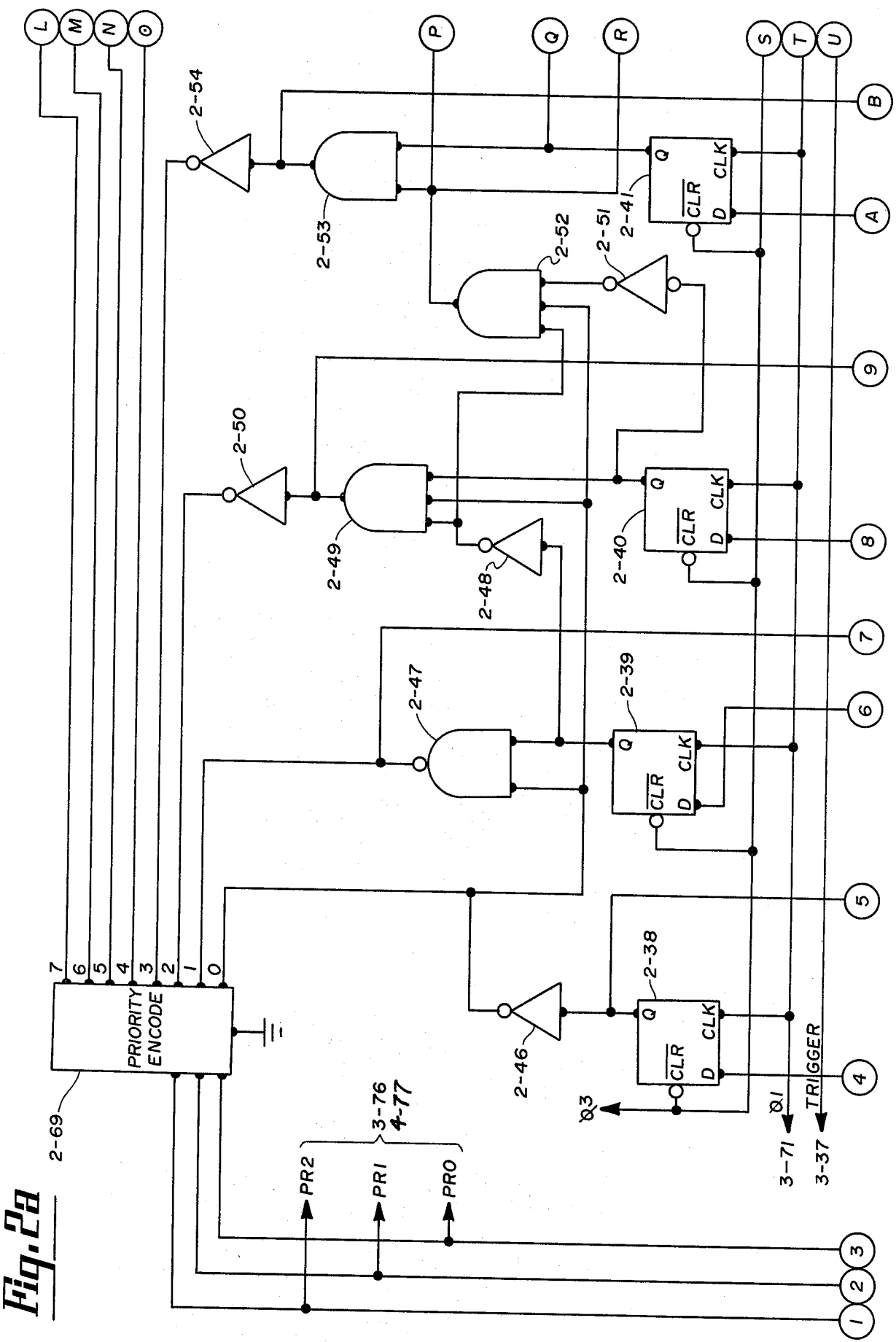
Figure 2B:
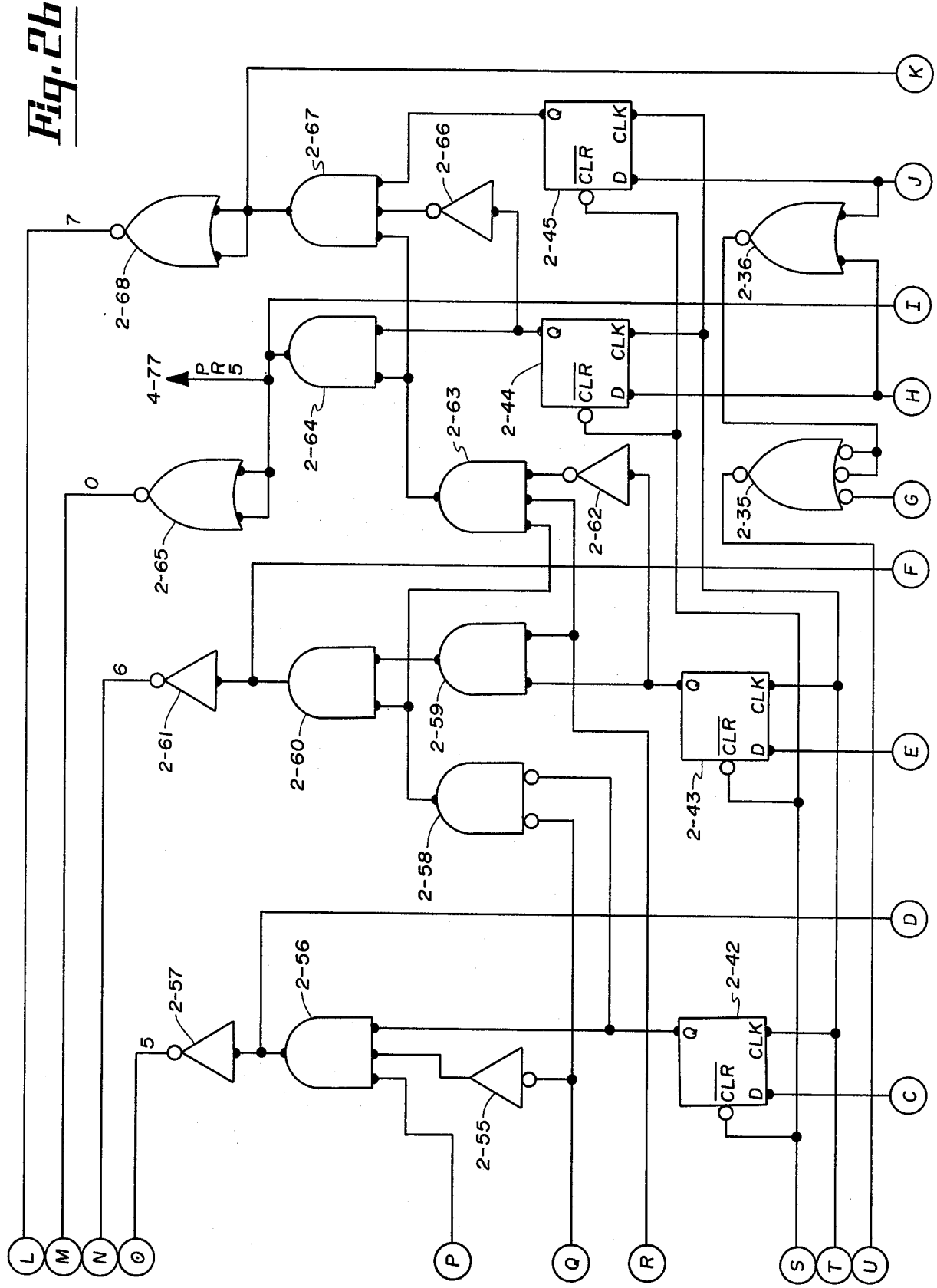
Figure 2C:
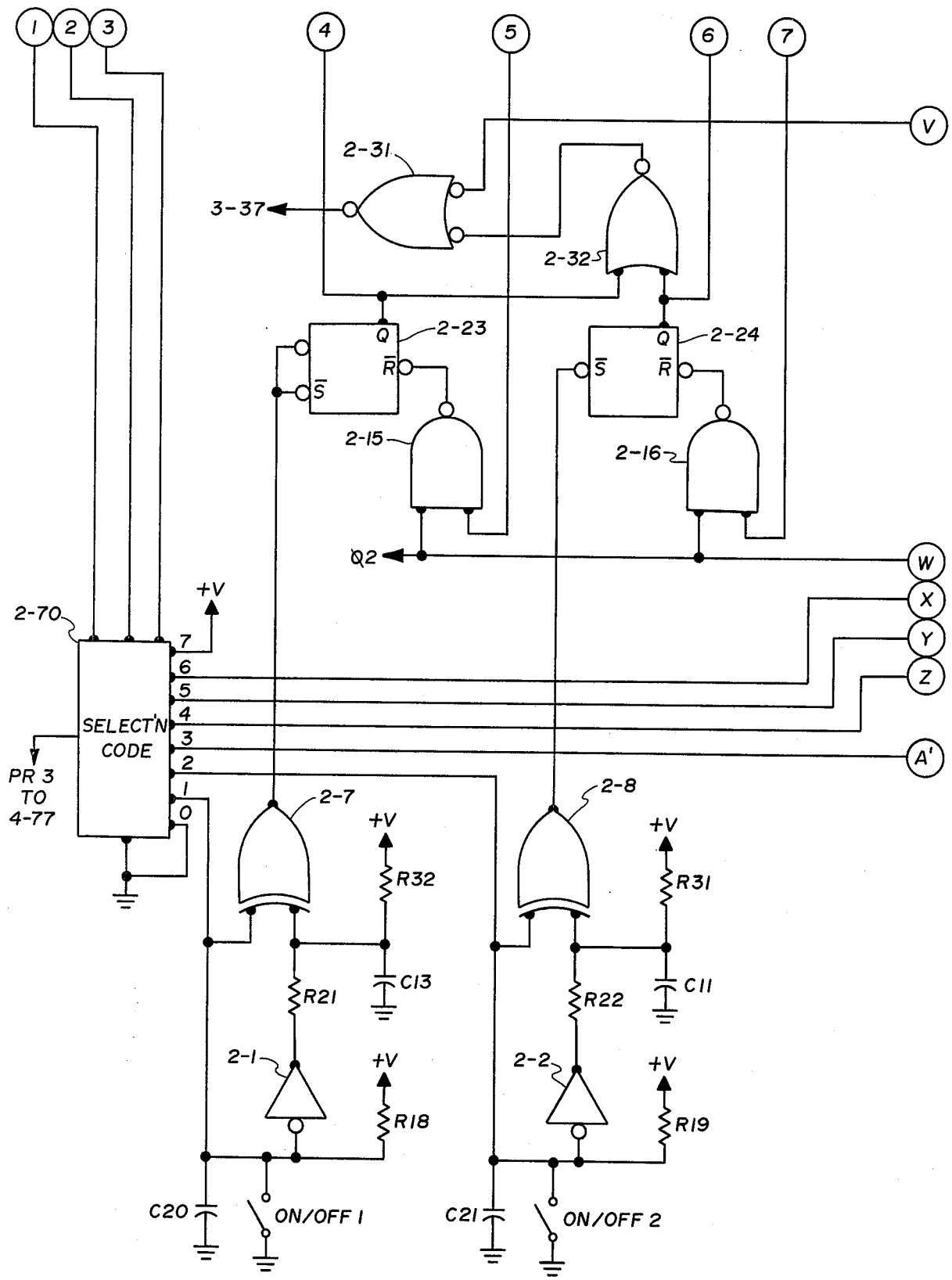
Figure 2D:
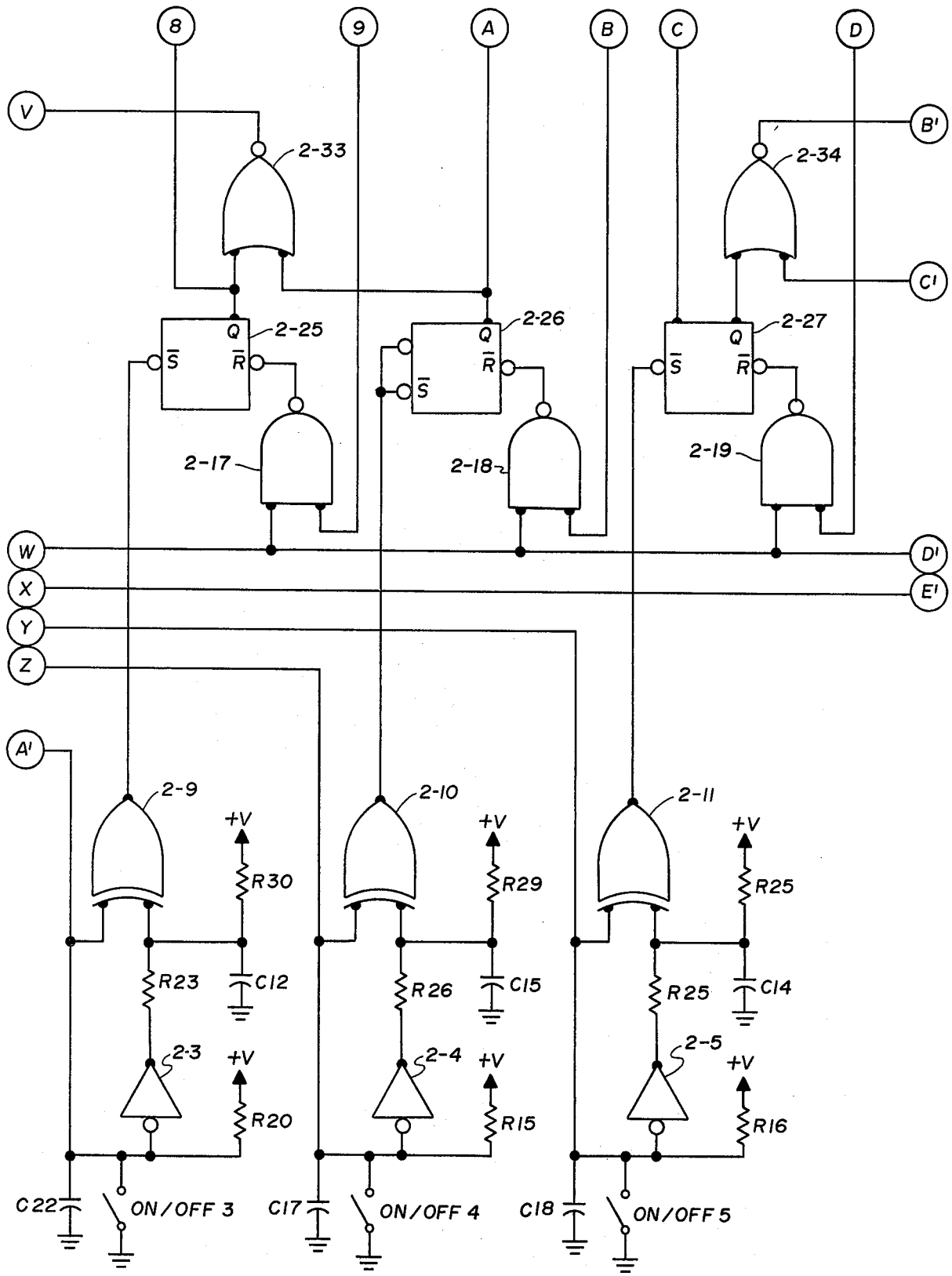

In a like manner, any change-of-state of On/Off switches 2 through 6 shown at the bottom of FIGS. 2c, 2d and 2e will result in the latches 2-24 through 2-28 to set, respectively, via the output from the associated Exclusive OR gates 2-8 through 2-11.

When the Cue Stop switch, shown in the lower right in FIG. 2e, is open, the output from inverter 2-71 will be low and the output from inverter 2-72 will be high. This high signal serves to enable the AND gate 2-74. With this gate partially enabled, a closure of the Fast-Forward Switch will result in the input to inverter 2-73 going low as the capacitor C28 charges through the resistor R42. During this time, the output of AND gate 2-74 goes low, causing the latch 2-29 to set. If the Cue Stop switch is closed, Fast-Forward commands will be inhibited by the AND gate 2-74. In a similar fashion, the closure of the Cue Stop switch causes the output from the inverter 2-72 to go low, thereby setting the latch 2-30 as the capacitor C23 charges through the resistor R34. A "set" condition for latches 2-23 through 2-28 indicates that the corresponding On/Off switch, shown at the bottom of FIGS. 2c, 2d and 2e, has changed state, while the latch 2-30 being set indicates that the Cue Stop switch has been closed and the flip-flop 2-29 being set indicates closure of the Fast-Forward switch with the Cue Stop switch closed. If any of these latches 2-23 through 2-30 are set, the combination of the gates 2-31 through 2-36 will cause the output of the gate 3-37

(FIG. 3) to go negative, thereby triggering the monostable multivibrator or one-shot circuit 3-71. (It is to be noted that the gates 2-31 through 2-36 and 3-37 may be replaced with a single eight-input OR gate.)

The one-shot circuits 3-71 through 3-74 are sequentially triggered to generate timing pulses φ1, φ2 and φ3. The one-shot 3-71 may be designed to remain in its unstable state for a period of 50 milliseconds while one-shot 3-72 remains in its unstable state for a period of 15 milliseconds. One-shots 3-73 and 3-74 each are designed to remain in their unstable state (following triggering) for a period of 2 microseconds. It is to be understood, however, that these values are exemplary only and other values may be used.

The φ1 timing signal clocks the information contained in the flip-flops 2-23 through 2-30 into the flip-flops 2-38 through 2-45 shown in FIGS. 2a and 2e. Once the encoding cycle has been initiated, any subsequent commands will be captured in the latches 2-23 through 2-30 but will not influence the encoding cycle.

Circuit 2-69 (FIG. 2a) is a commercially available priority encoder chip. If any one of its eight input lines receives a binary "low" signal, the binary code corresponding to that line will be generated at its output terminals. For example, if latch 2-38 becomes set due to operation of On/Off switch 1, the output of inverter 2-46 will go low, causing input line 0 of the priority encoder chip 2-69 to go low, thereby generating a 001 binary code at the output thereof. These three bits form the lower ordered bits of the six-bit Program Command Word PR 0, PR 1, and PR 2. This three-bit code is presented to the multiplexer 2-70 which corresponds to the multiplexer 18 in the block diagram of FIG. 1. With the code bit 001 applied to the selector inputs of the multiplexer 2-70, the input line 1 is selected. Thus, the output from the multiplexer 2-70 which forms the PR 3 bit of the command code will be a "1" if On/Off switch 1 is closed and will be a "0" if On/Off switch 1 is open. When the φ2 timing pulse goes positive, NAND gate 2-15 is enabled which causes the flip-flop 2-23 to be reset. When the φ3 timing signal goes positive, the flip-flop 2-38 is reset, thus completing the encode cycle for one command.

If On/Off switch 2 in FIG. 2c undergoes a change in state, the resulting signal will propagate in a similar fashion through the inverter 2-2, Exclusive OR gate 2-8, the latch 2-24, the latch 2-39 and the NAND gate 2-47 to cause input 1 of the encoder chip 2-69 to go low. This causes the encoder to output a binary code 010 (decimal 2). If On/Off switches 1 and 2 are changed simultaneously, then both flip-flops 2-38 and 2-39 will be set on the φ1 timing signal. In this event, the output of NAND gate 2-47 is held high by the output from inverter 2-46. Thus, the switch #1 channel is given the highest priority and is encoded on this command cycle.

At the end of the encode cycle, latches 2-23, 2-38 and 2-39 are cleared and On/Off switch 1 has been encoded. However, latch 2-24 remains set, thereby initiating a second timing cycle. Latch 2-39 is again set on the φ1 timing pulse and because flip-flop 2-38 remains cleared, the output of gate 2-47 goes low, causing On/Off switch 2 to be encoded.

It can be seen, then, that the priority system employed in the present invention assures an orderly encoding for any combination of transitions of the On/Off input switches. This priority structure is repeated for all of the other command switches shown in FIGS. 2c, 2d and 2e.

It should be noted especially that AND gate 2-49 (FIG. 2a) requires that latch 2-40 be set while latches 2-39 and 2-38 are cleared. Similarly, AND gates 2-52, 2-63 and 2-67 require that the flip-flops 2-38 through 2-44 be cleared while flip-flop 2-45 is set. Gates 2-46 through 2-48 thus establish the following order of priority:

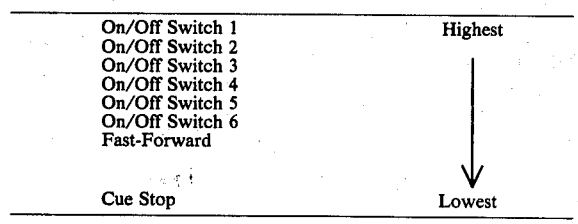

| On/Off Switch 1 | Highest |
| On/Off Switch 2 | |
| On/Off Switch 3 | |
| On/Off Switch 4 | |
| On/Off Switch 5 | |
| On/Off Switch 6 | |
| Fast-Forward | |
| Cue Stop | Lowest |

A Cue Stop command will not be encoded until all other active commands have been processed.

DISSOLVE RATE LOGIC

Figure 3:
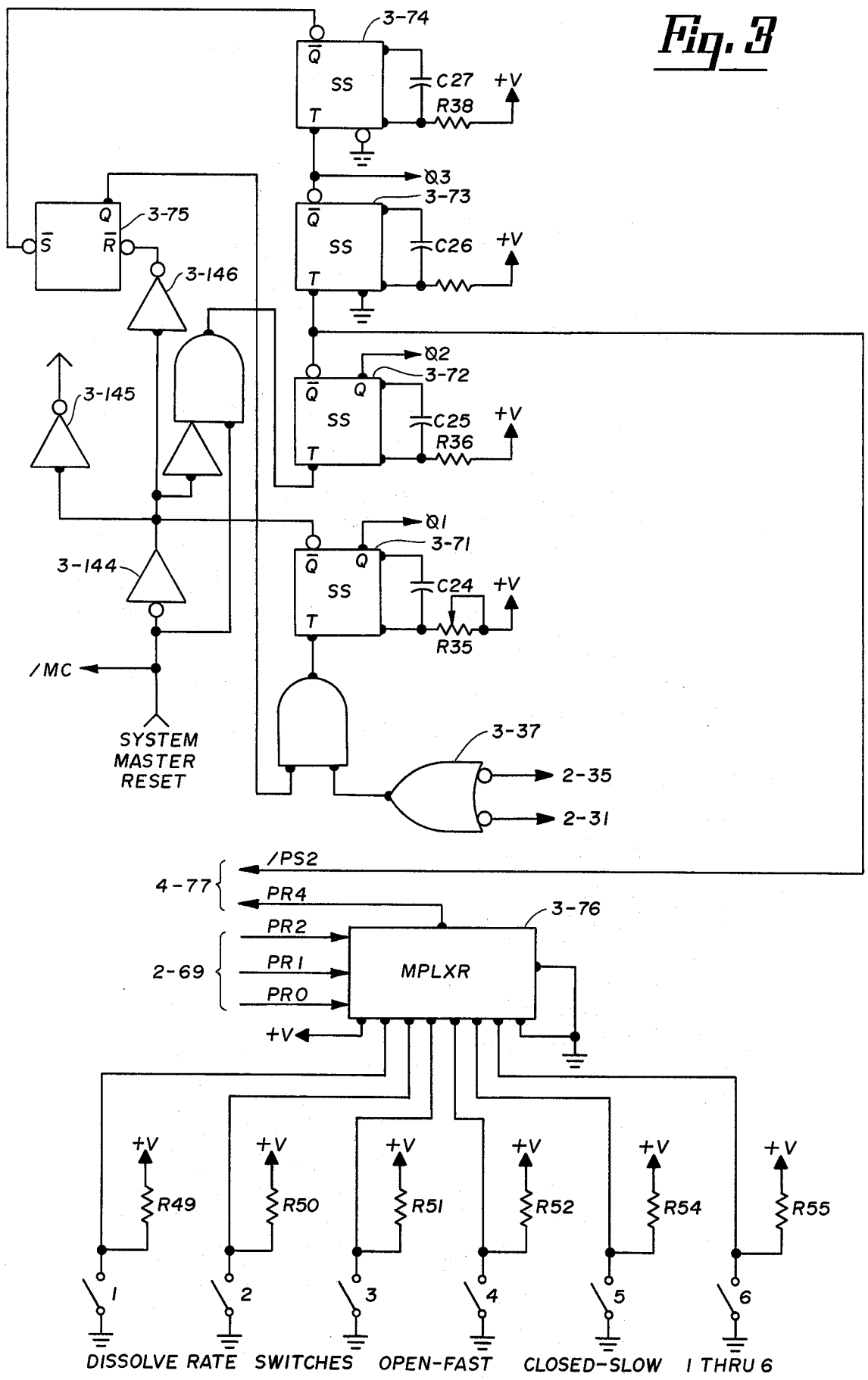
FIG. 3 illustrates by means of a digital logic diagram the timing pulse generator and an additional multiplexer used in the present invention.

The output bits of the Program Command Word PR 0, PR 1 and PR 2 which appear on the output lines from the priority encoder 2-69, also appear on the lines labeled PR 0, PR 1 and PR 2 in FIG. 2c and, from there, are applied to the selector inputs of the multiplexer chip 3-76 in FIG. 3. Multiplexer 3-76 senses the state (open or closed condition) of the six Dissolve Rate switches in bank 6 (FIG. 1). These six switches are also shown at the bottom of FIG. 3. As is shown by the legend on the drawing of FIG. 3, if the switch associated with a selected projector is closed, the output of the multiplexer appearing on the line labeled PR 4 will be a "0". If the switch is question is open, the PR 4 bit will be a binary "1" signal. As will become evident hereinbelow, when the PR 4 bit is a "1", the Dissolve Rate for the selected projector will be fast, whereas if bit PR 4 is a "0" the Dissolve Rate will be slow. The signal is ultimately used by the projector lamps to cause them to turn on slowly or at a more rapid rate or to turn off at a slow or fast rate.

TRANSMITTER/RECEIVER

Figure 4:
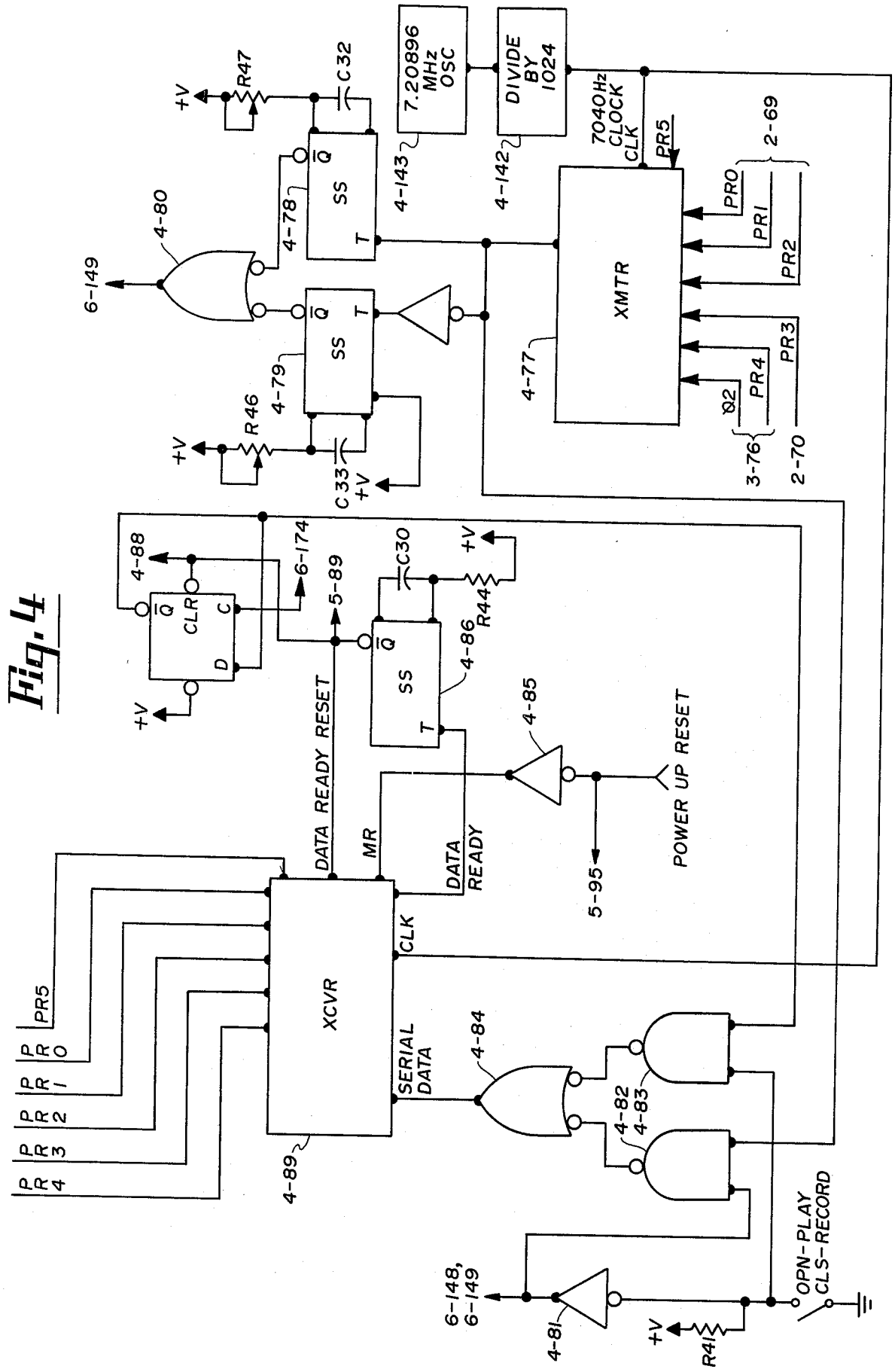
FIG. 4 illustrates by means of a logic diagram the digital transmitter and receiver and associated circuits employed in the present invention.

Referring now to FIG. 4, an oscillator 4-143 is provided which generates a 7.20896 MHz squarewave train. The output from the oscillator 4-143 is connected to a ten-bit binary counter 4-142 which serves to divide the frequency of the oscillator 4-143 by 1024, thus resulting in a 7040 Hz clock signal for driving the transmitter 4-77 and the receiver 4-89. At the end of the φ1 output from the one-shot circuit 3-71, the Program Command Word has been completely encoded and the states of the input signals PR 0 through PR 5 are stable. The leading edge of the φ2 pulse from one-shot circuit 3-72 causes the word to be entered into a buffer register contained within the transmitter and initiates the serialization of the data.

At this point, it should be mentioned that the transmitter 4-77 and the receiver 4-89 comprises a Universal Asynchronous Receiver/Transmitter (UART) of the type which is formed as an integrated circuit, commercially available through Texas Instruments, Incorporated and identified by their Part No. TMS 6011. A person desiring further information concerning the internal construction or mode of operation of this device is referred to the product specification sheets published by Texas Instruments, Incorporated relating to this part.

In the system of the present invention, each 16 clock cycles comprises one 2.27 millisecond bit time. The serial format employed in the transmitter is a start bit, followed by eight data bits, then a parity bit which is followed by two stop bits. For the present application, data bits 7 and 8 and the parity bit available in the UART are unused. The output from the transmitter 4-77 is connected to the trigger input terminal of monostable one-shots 4-78 and 4-79. One-shot 4-78 is designed such that its output remains low for a 0.7 millisecond interval on a negative transition while one-shot 4-79 responds imilarly for a positive transition. Thus, a positive 0.7 millisecond wide pulse appears at the output of gate 4-80 upon each transition in the serial data stream.

With the Record-Playback switch in its closed position, gate 4-82 is enabled by the output from the inverter 4-81 which allows the serial data to pass through the OR gate 4-84 to the Serial Data input terminal of the receiver 4-89. The high-to-low transition of the Start bit initiates the receiver, causing the Serial Data input to be sampled each 16 clock pulses and shifted into the receiver register which is a part of the UART integrated circuit chip. At the end of 12 bit times, the entire Program Command Word has been reconstructed in a parallel form and appears at the receiver output labeled PR 0 through PR 5. At this time, the Data Ready line of the receiver goes positive, to thereby trigger the one-shot circuit 4-86.

PROGRAM COMMAND DECODER

Figure 5A:
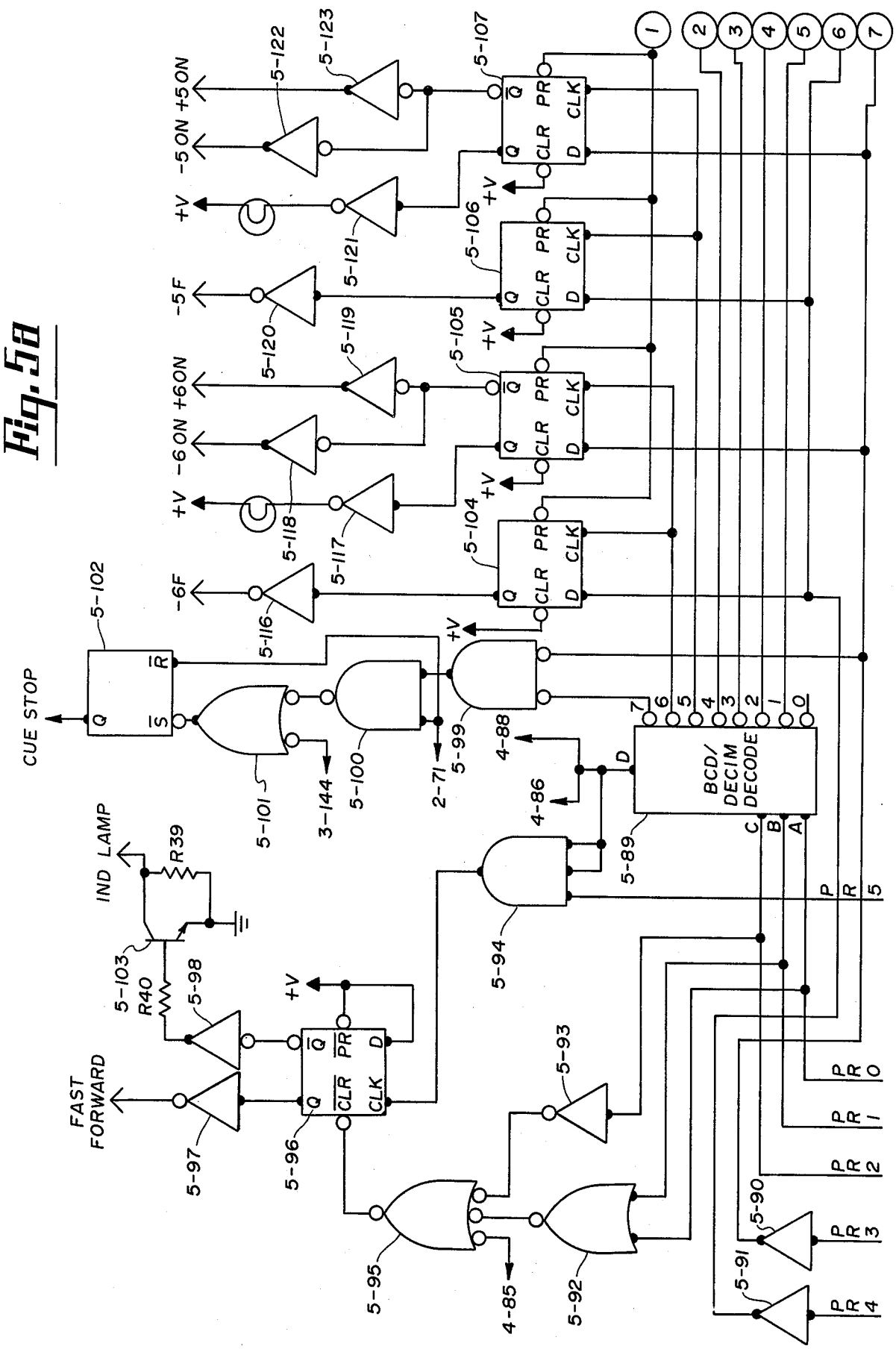
FIGS. 5a and 5b, when orientated as shown in FIG. 5, depict by means of a logic diagram the Program Control Word decoder and associated latches for developing the projector control signals.

Circuit 5-89 is a Binary Coded Decimal -to- Decimal Decoder. Its inputs labeled A, B, C and D form a binary code with D being the most significant bit thereof. The output line corresponding to the input binary code assumes a low binary condition with all other output lines remaining high. Since $7_{10}$ ($0111_2$) is the highest code used, no lines are selected unless the D-input is low, thus the Data Ready Reset signal emanating from the receiver 4-89 also acts as an enabler for the decoder 5-89. When the one-shot circuit 4-86 is triggered, the output line of the decoder 5-89, corresponding to the binary code represented by receiver 4-89 outputs PR 0, PR 1 and PR 2, goes low. When the one-shot 4-86 again resets, the D-input to the decoder 5-89 goes positive and the selected output line returns to its positive state. Therefore, it can be seen that an input switch transition results in a negative pulse being issued on the corresponding output line of the decoder network 5-89. If it is assumed that switch #1 has been selected, then the positive edge of the #1 output line of the decoder 5-89 causes the flip-flops 5-114 and 5-115 to be clocked. It should be recalled that bit PR 3 indicates whether the command is to turn on or to turn off a projector. This output from receiver 4-89 passes through the buffer amplifier 5-90 (FIG. 5a) to the D-input of the flip-flop 5-115 and an Off command will clear it.

Similarly, the state of bit PR 4 passes through the buffer amplifier 5-91 to control the state of its associated flip-flop 5-114 and thus determine whether the dissolve rate will be fast or slow. With flip-flop 5-115 set, the output from inverter 5-137 goes low, lighting an indicator lamp on the control panel (not shown) to indicate the On condition. In much the same manner, output lines #2 through #6 of the binary coded decimal-to-decimal decoder 5-89 will selectively clock the flip-flops 5-104 through 5-113 to control the projectors 2 through 6.

CUE STOP COMMAND

If the Cue Stop switch (FIG. 2e) is closed, bits PR 0, PR 1 and PR 2 will be encoded to a 111 code. Bit PR 3 will be a "0" since the input #7 terminal of the multiplexer 2-70 has been wired to a +5 Volt level, representative of a "1" condition. When both inputs of negative AND gate 5-99 are low, its output goes positive. The output of inverter 2-71 (FIG. 2e) goes high, and the output of NAND gate 5-100 goes low, thus setting the flip-flop 5-102 and the resulting output from the Q-terminal of this flip-flop, when applied to the cartridge tape unit, causes the unit to stop. In the record mode, the Cue Stop command is encoded onto the tape and then the tape is stopped. In the playback mode, the Cue Stop is read but ignored unless the Cue Stop switch is in its closed position.

FAST-FORWARD COMMAND

If the Fast-Forward (FF) switch (FIG. 2e) is closed, a command code word 101000 is developed. With PR 0, PR 1 and PR 2 all low, the output from the gate 5-92 and the inverter 5-93 are high and, thus, the output from the gate 5-95 is high, releasing the Clear on the flip-flop 5-96. With PR 5 high, when the Data Ready Reset line from the receiver 4-89 goes positive, the output from the gate 5-94 goes high, clocking the flip-flop 5-96 to the Set state, thereby propagating a Fast-Forward signal through inverter 5-97 and turning on the Fast-Forward indicator (not shown) by way of inverter 5-98 and its associated transistor switch 5-103. Any subsequent command will have a "1" in either PR 0, PR 1 or PR 2 positions, thus causing the output from the gate 5-95 to go low and thereby clear and flip-flop 5-96, returning the tape unit to a normal speed.

CARTRIDGE TAPE UNIT

When in the playback mode, the output from the inverter 4-81 is low, causing the outputs from the gates 6-148 and 6-149 to both be high, thus inhibiting any write currents from flowing through the tape recording head 6-154. In the record mode, the output from the inverter 4-81 is high. Thus, when a positive pulse is developed at the output of the gate 4-80, the gate 6-149 will produce a low output while the gate 6-148 produces a high output. This action generates a write current through the tape head 6-154. The resistors 6-155 and 6-156 prevent loading of the amplifier stage during the write operation, while resistors 6-152 and 6-153 prevent loading of the gates 6-148 and 6-149 during the read operation. The resistors 6-157 and 6-158 bias the amplifier 6-160 near ground while retaining a balanced input to reject common mode noise. Resistor 6-161 and capacitor 6-162 provide negative feedback to stabilize the gain of amplifier 6-160. The output signal from the amplifier 6-160 is AC coupled through a capacitor 6-164 to a second stage of amplification provided by amplifier circuit 6-167. Here, resistor 6-165 provides the DC bias while resistors 6-166 and 6-168 establish the gain. This amplification results in an output signal from the amplifier 6-167 which generally reproduces the pulse train present at the output of the gate 4-80 during the record operation.

The one-shot circuits 6-170 through 6-173 are employed to discriminate between a valid pulse and spurious noise. The one-shot circuit 6-170 is adjusted to produce a pulse having a width which is equal to the maximum limit of the read back pulse width, while the one-shot 6-172 is set to provide a pulse having a width equal to the minimum limit. One-shots 6-170 and 6-172 are both triggered on the positive-going edge of the pulse, while the one-shot 6-171 is triggered on the negative-going edge. As the one-shot 6-171 resets, it functions to trigger the one-shot 6-173, causing its output to go positive. Thus, if the readback pulse picked up by the transducing head 6-154 is of the proper width, the inputs to the gate 6-174 will be simultaneously positive, causing its output to go positive for a period determined by the one-shot circuit 6-173. Any spurious pulses which do not meet the timing criteria will be rejected.

Flip-flop 4-88 is initially cleared by the Data Ready Reset line going low at the end of the previous command. Thus, the Q output is initially in the high state. Each pulse from the gate 6-174 causes the flip-flop 4-88 to toggle, and thereby generate a serial data stream which is equivalent to the output from the transmitter 4-77.

With the Record/Play switch (FIG. 4) in its open position, the gate 4-83 is enabled. Thus, the serial data from flip-flop 4-88 propagates through gates 4-83 and 4-84 to the inputs of the receiver 4-87.

LAMP CONTROL CIRCUITS

Figure 7:
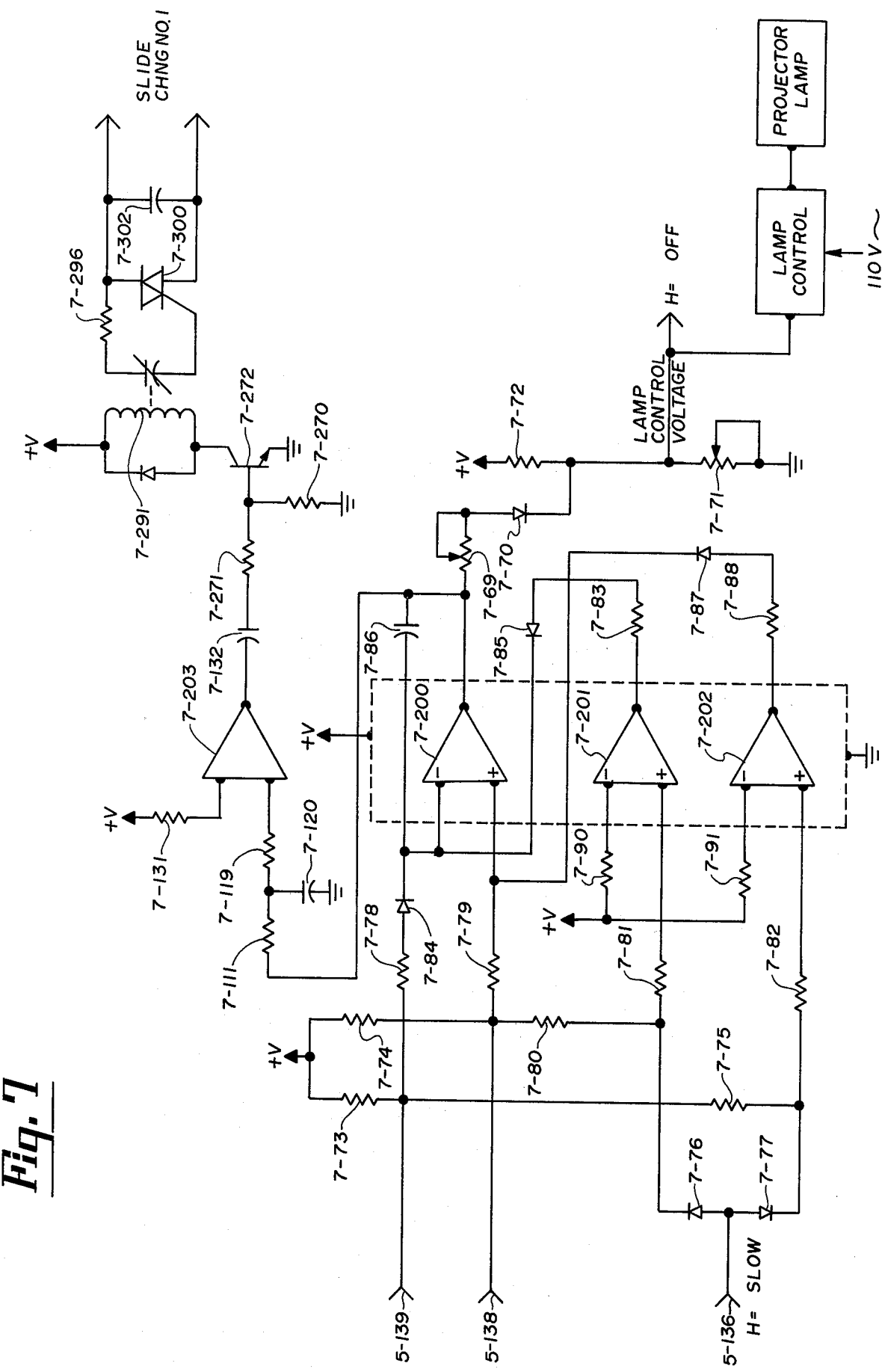
FIG. 7 is an electrical schematic of the projection lamp control circuits and slide advance pulse generator.
Figure 8:
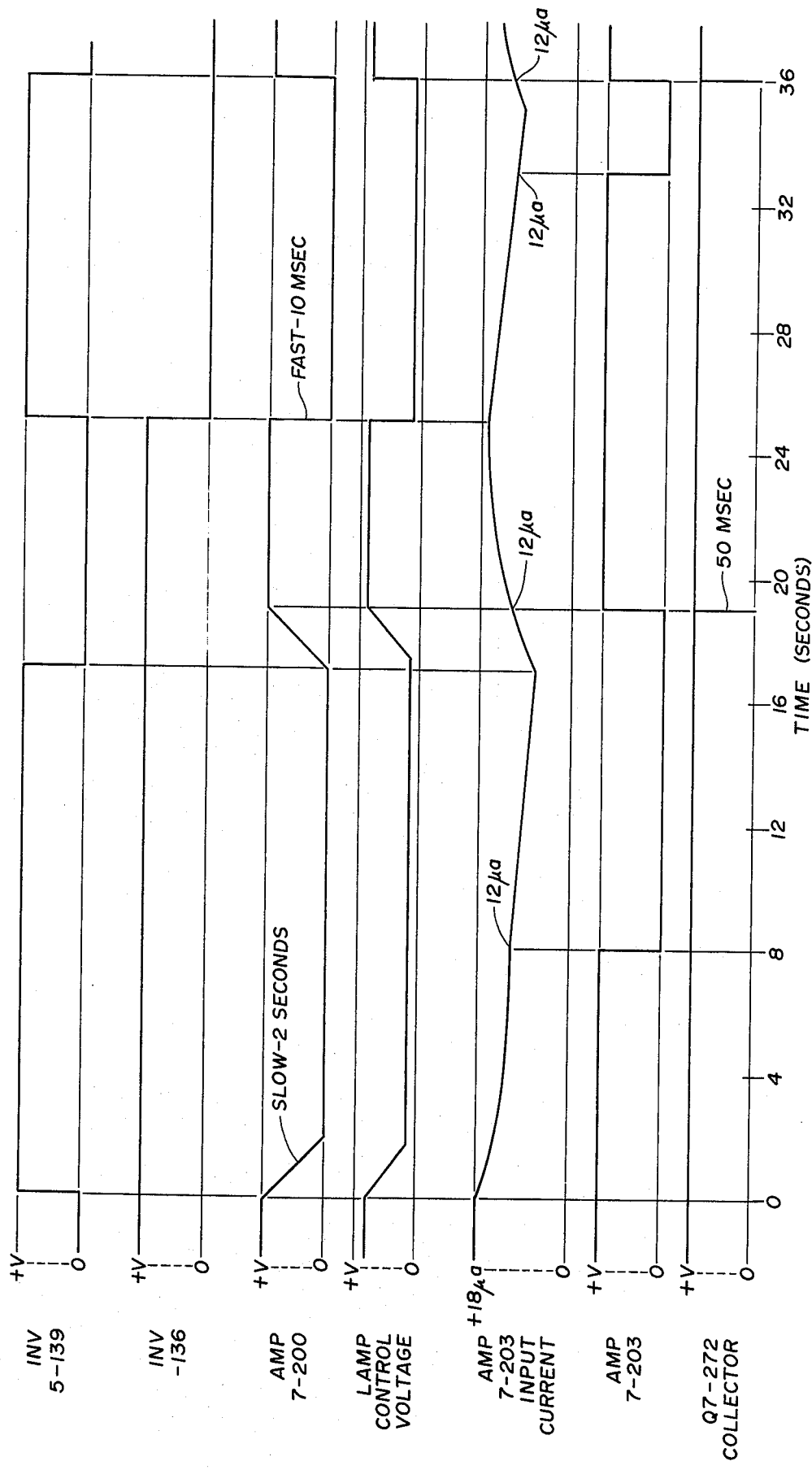
FIG. 8 is a timing diagram helpful in explaining the operation of the lamp control circuits of FIG. 7.

Referring to FIG. 7, amplifiers 7-200 through 7-203 are a special form of operational amplifier. The output voltage therefrom is proportional to the differential current present at the low impedance differential inputs. Amplifier 7-200 converts an ON/OFF command into a fast or slow ramp control voltage while amplifiers 7-201 and 7-202 control the rate. The response to the various combinations of commands is shown in the waveforms of FIG. 8.

Figure 5B:
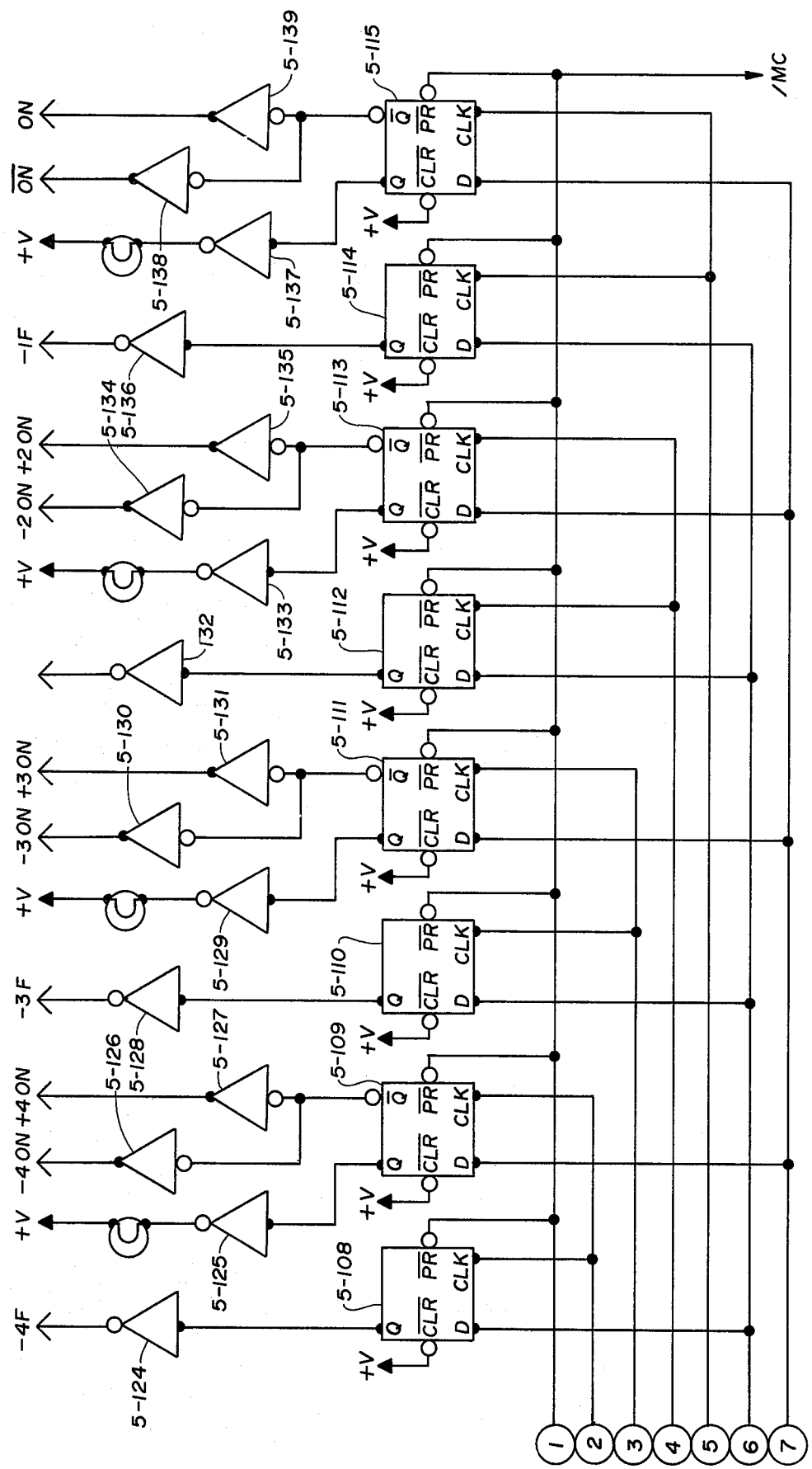

Consider first the case where the output from inverter 5-136 (FIG. 5b) is high, thus specifying a slow rate. Resistors 7-90 and 7-91 bias the non-inverting input of the operational amplifiers 7-201 and 7-202 at approximately 20 microamperes. Approximately 50 microamperes flows into the non-inverting inputs through the diodes 7-76 and 7-77 and resistors 7-81 and 7-82. With negative differential input currents, the outputs of the amplifiers 7-201 and 7-202 are low and, thus, no current flows through the diodes 7-85 and 7-87. Initially, the output from the inverter 5-139 is low and the output from inverter 5-138 is high. The inverting current into amplifier 7-200 is zero while resistor 7-79 provides approximately 60 microamperes of current into the non-inverting input of amplifier 7-200 to cause the output to go to positive saturation.

An ON command reverses the states of inverters 5-138 and 5-139 causing the 60 microampere current to flow into the inverting input while the non-inverting current goes to zero. This results in capacitor 7-86 discharging at a 60 microamp rate to negative saturation. This provides an approximate turn-on time of 2 seconds. The OFF command reverses the differential input current causing capacitor 7-86 to charge at a 60 microamp rate. If the output of inverter 5-136 is low, specifying a fast command, the current through diode 7-76 and 7-77 is zero and amplifiers 7-201 and 7-202 are controlled by the ON/OFF command. An ON command causes approximately 100 microamperes of current to flow through the resistors 7-75 and 7-82 to maintain the output of amplifier 7-202 low. However, since there is no current flowing through the resistors 7-80 and 7-81, the output from amplifier 7-201 is positive, causing approximately 10 milliamperes to flow through resistor 7-83 and the diode 7-85. This additional input current increases the discharge rate of capacitor 7-86 to decrease the turn-on time to approximately 20 milliseconds. Similarly, an OFF command influencing the turn-off time by causing amplifier 7-202 to go positive, thus providing a large non-inverting input current through resistors 7-88 and diode 7-87. Thus the resistor 7-78 controls slow turn-on, resistor 7-79 controls slow turn-off, resistor 7-83 controls fast turn-on and resistor 7-88 controls fast turn-off.

When amplifier 7-200 is in positive saturation, resistor 7-69 is adjusted such that the lamp control voltage is at the lamp turn-on threshold. When amplifier 7-200 is in negative saturation, the resistor 7-71 is adjusted so that the lamp control voltage is at the lamp turn-off threshold. Amplifier 7-203 is biased such that the output therefrom will be positive when the non-inverting input current to its exceeds approximately 12 microamperes. In the OFF state, approximately 18 microamperes flow through resistors 7-117 and 7-119. Following an ON command, the capacitor 7-120 causes the input to exponentially decay. At the time that it crosses the 12 microampere threshold, amplifier 7-203 goes low at its output, thus discharging the capacitor 7-132 through resistors 7-271 and 7-270. When the input current exceeds the 12 microampere threshold in response to an OFF command, the amplifier 7-203 goes positive, causing current to momentarily flow through capacitor 7-132, resistor 7-271 and into the base of the transistor 7-272. Thus, a current pulse flows through the solid state relay including the Triac 7-300 to momentarily energize the slide advance solenoid (not shown) contained in a slide projector being controlled. It is to be noted that a very short ON period will not advance the slide changer. This feature may be advantageously used to effect a blinking of one slide several times to produce a desired visual effect.

While the circuit of FIG. 7 illustrates the arrangement for controlling the ON/OFF condition of the projector lamps and the slide tray advance for only a single projector, it is to be understood that five additional, substantially identical circuits are provided for the remaining projectors, assuming that the present invention is being employed to control the mode of operation of a total of six projectors.

EVENT COUNTER

Referring to FIG. 9, there is shown the circuitry for implementing the event counter module of the block diagram of FIG. 1. Included is a one-shot circuit 9-139, the output of which coupled to the Count input terminal of a three-digit decimal counter 9-140 which has associated therewith a three-digit light emitting diode (LED) display 9-141.

Figure 6:
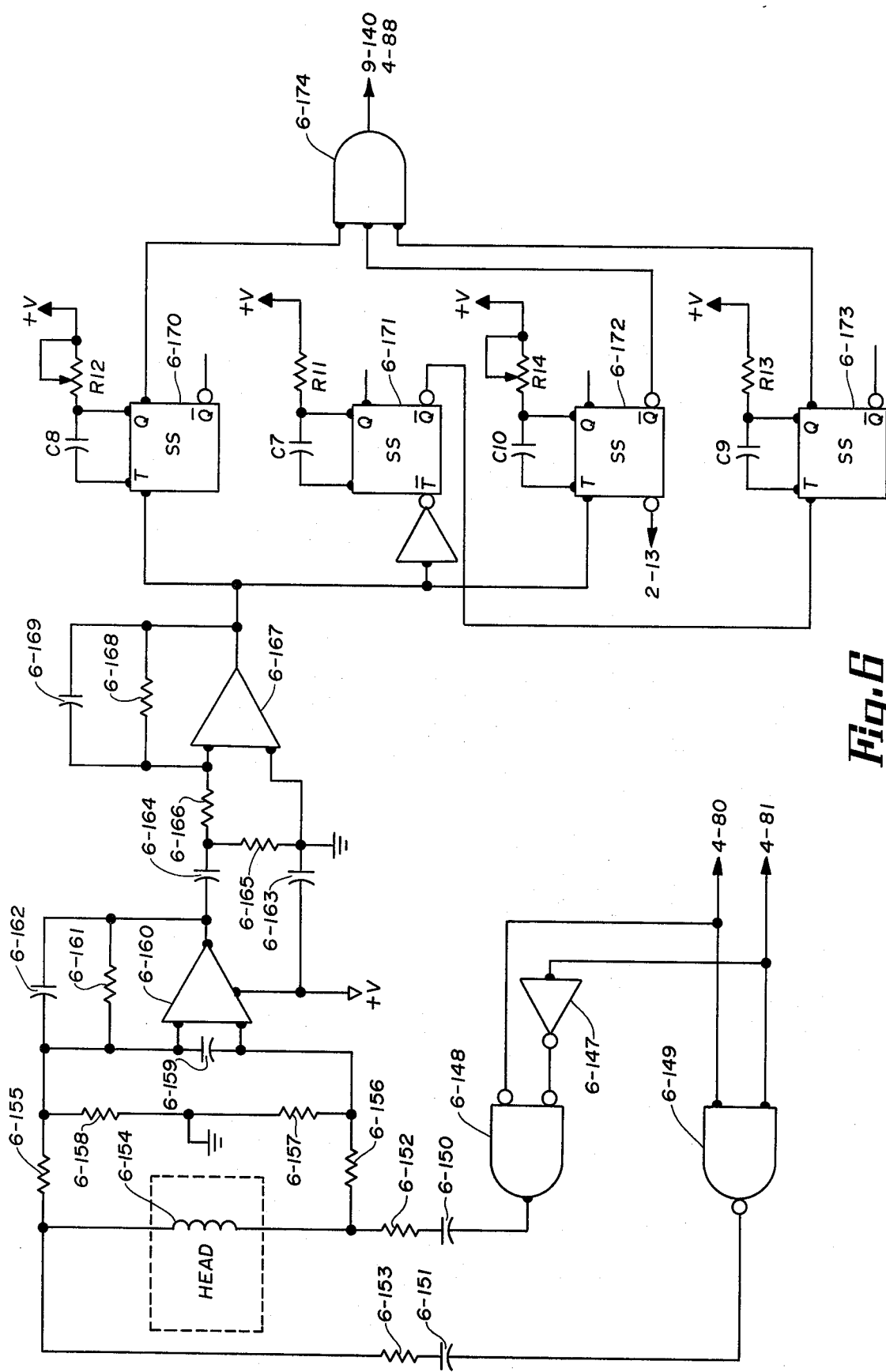
FIG. 6 illustrates the magnetic tape cartridge read/write circuits.

Associated with the toggle input terminal of the one-shot circuit 9-139 is an AND gate 9-142 which is partially enabled by a signal from the output of an inverter 9-143 unless a Power-Up Reset condition is in effect. The output from the AND gate 6-174 (FIG. 6) is applied as a second input to the AND gate 9-142 so that each time a valid command is picked up by the magnetic head 6-154, the one-shot circuit 9-139 will be toggled to advance the three-decimal digit counter 9-140. The contents of the counter, then, can be used to index the commands on the magnetic tape cartridge. When it is desired to perform an edit function, the operator need only advance the tape until a desired index count is registered and at that point a new command may be recorded by selective operation of one of the console switches. The clear terminal of the counter 9-140 is connected to the output of inverter 3-145. A signal will be produced on this terminal as such, during Power-Up conditions, and, hence, the event counter is reset to 0 at System Turn-On.

We claim:

1. Apparatus for controlling the operation of plural photographic projectors comprising, in combination:
   (a) manually operable switching means for selecting which of and how a plurality of projectors are to be activated;
   (b) encoding means coupled to said switching means for developing multibit Program Command Words upon each operation of said switching means;
   (c) a change of state detector connected intermediate said switching means and said encoding means for detecting a change in the status of said switching means; and
   (d) decoding means responsive to said Program Control Words for applying control signals to selected ones of said plural projectors for causing said selected projectors to operate in a desired fashion.

2. Apparatus as in claim 1 and further including:
   (a) a parallel to serial converter connected to said encoding means for serializing the bits comprising said Program Command Words; and
   (b) storage means coupled to said converter for storing the serialized bits for subsequent playback.

3. Apparatus as in claim 2 and further including means for transmitting the serialized bits to said decoding means concurrently with the entry thereof into said storage means.

4. Apparatus as in claim 2 wherein said manually operable switching means comprises:
   (a) a first bank of switches, equal in number to the number of plural projectors to be controlled, for specifying the ON/OFF condition of said projectors;
   (b) a second bank of switches, equal in number to the number of projectors to be controlled for specifying the rate at which the projection lamps is selected projectors is brightened or dimmed; and
   (c) a third bank of switches for controlling said storage means.

5. Apparatus as in claim 1 wherein said encoding means comprises:
   (a) a decimal to binary coded decimal converter having its inputs connected to the output of said change of state detector;
   (b) a first multiplexer having its selector inputs connected to the output of said decimal to binary coded decimal converter and its data inputs connected to the switches in said first bank; and
   (c) a second multiplexer having its selector inputs connected to the output of said decimal to binary coded decimal converter and its data inputs connected to the switches in said second bank, the arrangement being such that the outputs from said decimal-to-binary coded decimal converter and said first and second multiplexer defines a multibit Program Command Word.

6. Apparatus as in claim 1 wherein said decoding means comprises a binary-to-decimal decoder.

7. Apparatus as in claim 3 and further including means for selectively applying the serialized bits in said storage means to said decoding means.

8. Apparatus for controlling the ON/OFF state and dissolve rate for plural photographic projector devices comprising:
   (a) first and second banks of switches operable between open and closed positions, one switch in each of said banks being associated with a corresponding projector;
   (b) means connected to said switches for detecting a change in state of switches in said first bank from an open to a closed position or from a closed to an open position;
   (c) encoding means coupled to said change of state detecting means for developing a unique binary code for each switch in said first bank whose state has been changed;
   (d) first multiplexer means coupled to said switches in said first bank and responsive to said unique binary code for developing an additional code bit indicative of whether the switch defined by said unique code is open or closed;
   (e) second multiplexer means coupled to said switches in said second bank and responsive to said unique binary code for developing a further code bit indicative of whether the switch in said second bank defined by said unique code is opened or closed;
   (f) means for transmitting said unique code, said additional bit and said further bit in a serial format bit stream to digital data recording means and to receiving means, said receiving means including serial-to-parallel converting means; and
   (g) decoding means coupled to said receiving means for decoding said unique code, said additional bit and said further bit for producing control signals for the projector associated with the switch in said first bank whose state has been changed.

9. Apparatus as in claim 8 and further including means for selectively connecting said digital data recording means to said receiving means.

10. Apparatus as in claim 8 and further including current generating means coupled to the projection lamps in said plural projectors, said current generating means coupled to receive said control signals from said decoding means, the arrangement being such that the rate at which current is applied to said projection lamps is a function of the open or closed condition of the switch in said second bank specified by said unique code.

11. Apparatus as in claim 8 and further including:
   (a) a third bank of switches connected to said means for detecting a change in state of said switches in said first bank, the arrangement being such that said encoding means develops still further code bits which when decoded by said decoding means are used to control said digital data recording means.

* * * * *

UNITED STATES PATENT OFFICE
CERTIFICATE OF CORRECTION

PATENT NO. : 4,086,005
DATED : April 25, 1978
INVENTOR(S) : Erik N. Honebrink and Jon N. Myntti It is certified that error appears in the above-identified patent and that said Letters Patent are hereby corrected as shown below:

Column 4, line 49, "rates" should read -- rate --.

Column 8, line 61, "comprises" should read -- comprise --.

Column 10, line 36, "and flip-flop" should read -- the flip-flop --.

Column 11, line 17, "Q" should read -- $\overline{Q}$ --.

Column 12, line 20, "its" should read -- it --.

Column 13, Claim 4, section (b), line 45, "is" should read -- in --.

Signed and Sealed this

Fifteenth Day of August 1978

[SEAL]

Attest:

RUTH C. MASON
Attesting Officer

DONALD W. BANNER
Commissioner of Patents and Trademarks